Patented May 5, 1953

2,637,741

UNITED STATES PATENT OFFICE 2,637,741

DIBENZYL TETRATHIODIGLYCOLATE

Leon Libenson, Pittsburgh, Pa.

No Drawing. Application June 6, 1951,
Serial No. 230,260

1 Claim. (Cl. 260—481)

This invention relates to a new and useful derivative of tetrathiodiglycollic acid.

Tetrathiodiglycollic acid has been found to be of considerable therapeutic value because of its high content of readily available sulfur. The acid may be represented by the formula

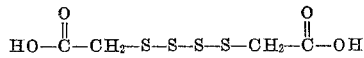

It is a relatively unstable compound and decomposes in the presence of moisture with liberation of molecular sulfur, $(S_2)$. However, use of the acid therapeutically is subject to the objection that it has an irritating and somewhat painful effect upon the skin and soft tissues. Also, the acid and many of the derivatives of the acid possesses strong, objectionable odors characteristic of many organo-sulfur compounds.

The present invention provides a new and improved derivative of tetrathiodiglycollic acid, free from the objections noted above and of marked therapeutic effectiveness, especially in the treating of skin diseases.

I have found that the dibenzyl ester of tetrathiodiglycollic acid may be prepared by reacting benzyl alcohol with tetrathiodiglycollic acid in anhydrous acid media and that the resultant ester is free from the objectionable characteristics of the acid and is highly effective therapeutically, particularly in the treating of skin diseases.

Accordingly, my invention provides as an improved pharmaceutical compound, dibenzyl tetrathiodiglycollate which may be represented by the formula

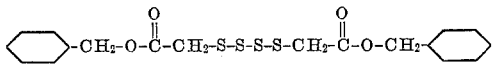

As previously noted, this new chemical compound may be prepared by dissolving tetrathiodiglycollic acid in anhydrous benzyl alcohol to which there has been added a minor proportion of a strong acid, e. g. HCl, or concentrated sulfuric acid, and permitting the acid solution to stand for several days at room temperature. The resultant reaction mixture is then poured into cold water, shaken vigorously and then allowed to stand to permit separation of the ester layer. Thereafter, the separated ester may be washed, and thoroughly dried. By this method, the dibenzyl ester of a purity in excess of 95%, as indicated by the sulfur content of the ester product, may be prepared.

One method by which the compound of my present invention may be prepared will be illustrated by the following specific examples.

Example I 20 gms. of tetrathiodiglycollic acid is dissolved in 20 gms. of anhydrous benzyl alcohol, which has previously been saturated with anhydrous HCl, and the solution is permitted to stand at room temperature for one week. At the end of that period, the resultant mixture is poured into one liter of cold distilled water and shaken vigorously. The mixture is then allowed to stand to permit the separation of an ester layer and an aqueous layer. The ester layer is removed from the aqueous layer and mixed with two volumes of acetone and the mixture poured into one liter of cold distilled water and shaken vigorously. This mixture is allowed to stand to again permit the separation of the ester layer, and the ester layer is twice washed with one liter of cold distilled water. The separated, washed ester is then placed in a dry flask with anhydrous sodium sulfate to effect the drying of the ester and, after standing 48 hours at room temperature, the ester is separated from the mixture by filtering, centrifuging, or decanting.

Example II 20 gms. of tetrathiodiglycollic acid is dissolved in 20 gms. of anhydrous benzyl alcohol to which 10% of concentrated sulfuric acid, by weight, has previously been added. After standing for one week at room temperature, the mixture is poured into one liter of cold distilled water and shaken vigorously and then allowed to stand to permit separation of the ester layer. The ester layer is then mixed with two volumes of acetone and the mixture poured into one liter of cold distilled water and again shaken vigorously. The esters are then separated and washed twice with one liter of cold distilled water and the washed ester separated and dried, as in Example I.

The benzyl tetrathiodiglycollate thus obtained is a colorless liquid, very slightly soluble in water, sparingly soluble in alcohol, but soluble in ether, acetone, carbon disulfide and carbon tetrachloride. It has a specific gravity at 20° C. to 1.050 and decomposes before distilling when heated under an absolute pressure of 1 mm. of mercury.

The composition of the product was found by elemental analysis to compare favorably with the theoretical composition of dibenzyl tetrathiodiglycollate

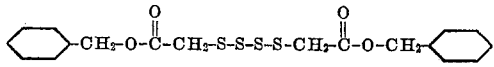

|  | Found | Theoretical |
|---|---|---|
| Carbon, percent | 51.60 | 50.70 |
| Hydrogen, percent | 4.75 | 4.22 |
| Sulfur, percent | 28.55 | 30.04 |

The product of the present invention has been found to be stable at room temperature provided it be kept in a substantially anhydrous condition. However, upon application to moist tissues, such as the skin, the ester gradually decomposes according to the formula

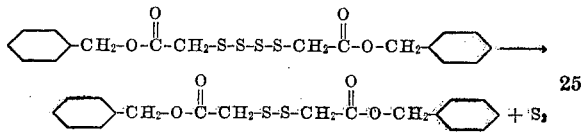

This derivative of tetrathiodiglycollic acid may be applied to the skin without irritation and has been used effectively in treating skin disease refractory to other forms of treatment, including fungus infections, eczemas, and other forms of dermatitis. Further, as previously noted, this compound, unlike most other derivatives of tetrathiodiglycollic acid, does not have an objectionable odor but, to the contrary, has a rather pleasant odor.

Though, at the present time, the primary use of this compound is for pharmaceutical purposes, its utility is not so limited. It will be found useful for other purposes where liberation of molecular sulfur is desired.

Therapeutically, the ester may be used for topical application, for instance, as an ingredient of salves, or ointments, in an anhydrous vehicle, as more particularly described and claimed in my copending application Serial No. 230,259, filed concurrently, herewith.

I claim:
Dibenzyl tetrathiodiglycollate.

LEON LIBENSON.

No references cited.